United States Patent
Kiely et al.

(10) Patent No.: US 9,202,499 B2
(45) Date of Patent: Dec. 1, 2015

(54) CONTACT DETECTION USING LASER MODULATION

(71) Applicant: Seagate Technology LLC, Cupertino, CA (US)

(72) Inventors: James Dillon Kiely, Edina, MN (US); Karl Scheppers, Edina, MN (US); Declan Macken, Prior Lake, MN (US); Michael Thomas Johnson, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 283 days.

(21) Appl. No.: 13/802,386

(22) Filed: Mar. 13, 2013

(65) Prior Publication Data

US 2014/0269819 A1   Sep. 18, 2014

(51) Int. Cl.
G11B 5/60    (2006.01)
G11B 5/31    (2006.01)
G11B 5/00    (2006.01)

(52) U.S. Cl.
CPC .............. *G11B 5/6076* (2013.01); *G11B 5/314* (2013.01); *G11B 5/3116* (2013.01); *G11B 5/3133* (2013.01); *G11B 5/3136* (2013.01); *G11B 5/607* (2013.01); *G11B 2005/0021* (2013.01)

(58) Field of Classification Search
CPC ...... G11B 5/00; G11B 5/3116; G11B 5/3133; G11B 5/3136; G11B 5/607; G11B 5/6076; G11B 5/314; G11B 2005/0021; G01B 21/16
USPC ........ 374/45; 369/13.13, 13.33, 13.32, 13.17, 369/44.11, 44.12; 360/59, 313, 324, 326, 360/328
See application file for complete search history.

(56) References Cited

U.S. PATENT DOCUMENTS

| | | | |
|---|---|---|---|
| 6,233,206 B1 | 5/2001 | Hamann et al. | |
| 6,762,977 B1* | 7/2004 | Gage et al. | 369/13.13 |
| 6,950,267 B1 | 9/2005 | Liu et al. | |
| 6,965,622 B1* | 11/2005 | Cho et al. | 372/33 |
| 7,317,665 B2 | 1/2008 | Watanabe et al. | |
| 7,345,840 B2 | 3/2008 | Gomez et al. | |
| 7,349,170 B1* | 3/2008 | Rudman et al. | 360/75 |
| 7,538,978 B2 | 5/2009 | Sato et al. | |

(Continued)

FOREIGN PATENT DOCUMENTS

| | | |
|---|---|---|
| JP | 2003509795 | 3/2003 |
| JP | 2011258255 | 12/2011 |

(Continued)

OTHER PUBLICATIONS

File History for U.S. Appl. No. 13/794,700 as was retrieved from the U.S. Patent and Trademark Office on Apr. 25, 2014, 93 pages.

(Continued)

*Primary Examiner* — Lisa Caputo
*Assistant Examiner* — Philip Cotey
(74) *Attorney, Agent, or Firm* — Hollingsworth Davis, LLC (57) ABSTRACT

An apparatus is arranged to detect contact between an air bearing surface of a transducer and a medium using a modulated thermal sensor signal. A laser source produces modulated laser light. A thermal sensor is disposed at or near the air bearing surface and is subject to cyclic heating by the modulated laser light. The thermal sensor is configured to produce the modulated sensor signal in response to the cyclic heating.

24 Claims, 10 Drawing Sheets

(56) References Cited

U.S. PATENT DOCUMENTS

| | | | |
|---|---|---|---|
| 7,542,228 B2 | 6/2009 | Knigge et al. | |
| 7,626,894 B2 | 12/2009 | Bedillion et al. | |
| 7,796,353 B2 | 9/2010 | Schabes et al. | |
| 7,796,356 B1 | 9/2010 | Fowler et al. | |
| 7,804,656 B2 | 9/2010 | Gomez et al. | |
| 7,990,647 B2 | 8/2011 | Lille | |
| 8,149,541 B2 | 4/2012 | Baumgart | |
| 8,149,653 B2 | 4/2012 | Shimazawa et al. | |
| 8,248,895 B2 | 8/2012 | Shimazawa et al. | |
| 8,248,897 B2 | 8/2012 | Shimazawa et al. | |
| 8,310,902 B1 * | 11/2012 | Contreras et al. | 369/13.33 |
| 8,315,128 B1 | 11/2012 | Wilson et al. | |
| 8,339,905 B2 | 12/2012 | Rausch et al. | |
| 8,908,480 B1 | 12/2014 | Krichevsky | |
| 2002/0176452 A1 * | 11/2002 | Lin et al. | 372/18 |
| 2005/0265139 A1 | 12/2005 | Gomez et al. | |
| 2006/0187564 A1 | 8/2006 | Sato et al. | |
| 2006/0203862 A1 * | 9/2006 | Bonen et al. | 372/34 |
| 2006/0233061 A1 | 10/2006 | Rausch et al. | |
| 2006/0233062 A1 | 10/2006 | Bedillion et al. | |
| 2006/0239313 A1 * | 10/2006 | Hosking | 372/34 |
| 2007/0058686 A1 | 3/2007 | Capasso et al. | |
| 2007/0230012 A1 | 10/2007 | Erden et al. | |
| 2008/0117727 A1 | 5/2008 | Matsumoto | |
| 2008/0123219 A1 | 5/2008 | Gomez et al. | |
| 2008/0225426 A1 * | 9/2008 | Roy et al. | 360/31 |
| 2009/0225464 A1 * | 9/2009 | Juang et al. | 360/59 |
| 2010/0002330 A1 * | 1/2010 | Lille | 360/59 |
| 2010/0007980 A1 | 1/2010 | Kim et al. | |
| 2010/0232067 A1 | 9/2010 | Liners et al. | |
| 2010/0271910 A1 | 10/2010 | Boutaghou | |
| 2011/0026156 A1 | 2/2011 | Shimazawa et al. | |
| 2011/0205861 A1 | 8/2011 | Erden et al. | |
| 2011/0228649 A1 | 9/2011 | Shimazawa et al. | |
| 2011/0228650 A1 | 9/2011 | Shimazawa et al. | |
| 2011/0228653 A1 | 9/2011 | Shimazawa et al. | |
| 2011/0299367 A1 | 12/2011 | Naniwa et al. | |
| 2012/0113207 A1 | 5/2012 | Zheng | |
| 2012/0201108 A1 | 8/2012 | Zheng et al. | |
| 2012/0300599 A1 | 11/2012 | Contreras et al. | |
| 2012/0327752 A1 | 12/2012 | Snyder | |
| 2013/0107390 A1 * | 5/2013 | Huang et al. | 360/31 |
| 2013/0107680 A1 * | 5/2013 | Contreras et al. | 369/13.32 |
| 2013/0176836 A1 | 7/2013 | Zheludev et al. | |
| 2013/0265860 A1 * | 10/2013 | Gage et al. | 369/13.32 |

FOREIGN PATENT DOCUMENTS

| | | |
|---|---|---|
| JP | 2012104213 | 5/2012 |
| JP | 2012248266 | 12/2012 |
| WO | WO2012068399 | 5/2012 |

OTHER PUBLICATIONS

U.S. Appl. No. 13/794,700, Kiely.
File History for U.S. Appl. No. 13/794,700 as was retrieved from the U.S. Patent and Trademark Office on Jan. 26, 2015, 153 pages.
File History for U.S. Appl. No. 13/794,700 as was retrieved from the U.S. Patent and Trademark Office on Jul. 20, 2015, 187 pages.
Office Action dated Jan. 13, 2015 from Japanese Application No. 2014-048821, 3 pages.
Office Action dated Apr. 21, 2015 from Korean Application No. 10-2014-0026643, 6 pages.

* cited by examiner

CONTACT DETECTION USING LASER MODULATION

SUMMARY

Some embodiments are directed to an apparatus configured to detect contact using a thermal sensor signal. The apparatus includes a laser source configured to produce modulated laser light and a transducer comprising an air bearing surface. According to some aspects, the transducer is configured to use the laser light as an energy source for heating a region of a magnetic medium. A thermal sensor is disposed at or near the air bearing surface and is subject to cyclic heating by the modulated laser light. The thermal sensor is configured to produce a modulated sensor signal in response to the cyclic heating.

Some embodiments involve a method for detecting contact using a laser modulated sensor signal. The method includes producing modulated laser light. A thermal sensor provided at or near an air bearing surface of a transducer is cyclically heated using the modulated laser light. A modulated thermal sensor signal is generated in response to the cyclic heating of the thermal sensor.

These and other features and aspects of various embodiments may be understood in view of the following detailed discussion and accompanying drawings.

DETAILED DESCRIPTION

The present disclosure generally relates to magnetic recording devices used for data storage. Data storage systems may include one or more transducers that respectively write (e.g., a writer) and read (e.g., a reader) information to and from a magnetic storage medium. It is typically desirable to have a relatively small distance or separation between a transducer and its associated media. This distance or spacing is referred to herein as "head-media separation" (HMS). By reducing the head-media separation, a reader and a writer is generally better able to both write and read data to and from a medium. Reducing the head-media separation also allows for surveying of magnetic storage medium topography, such as for detecting asperities and other features of the recording medium surface.

Various embodiments involve heat-assisted magnetic recording (HAMR) recording. In HAMR systems, also sometimes referred to as thermal-assisted magnetic recording (TAMR) systems, a magnetic storage medium (e.g., a hard drive disk) is able to overcome superparamagnetic effects that limit the areal data density of typical magnetic media. In a HAMR recording system, information bits are recorded on a magnetic storage layer at elevated temperatures. The heated area in the storage layer determines the data bit dimension, and linear recording density is determined by the magnetic transitions between the data bits.

In order to achieve desired data density, a HAMR head transducer includes optical components that direct light from a laser to the magnetic storage medium. The HAMR media hotspot may need to be smaller than a half-wavelength of light available from current sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT is designed to reach local surface-plasmon at a designed light wavelength. At resonance, a high electric field surrounds the NFT due to the collective oscillation of electrons in the metal of the NFT. Part of the field will tunnel into the magnetic storage medium and get absorbed, raising the temperature of the medium locally for recording. The increase in local temperature of the medium reduces the coercivity of the magnetic material significantly, preferably to zero, which enables recording of data on high anisotropy magnetic media using fields of relatively low flux density.

An important function of a hard disk drive (HDD), for example, is to accurately set the clearance between the head transducer and the surface of the magnetic storage medium of the HDD. Toward this end, various techniques can be used to detect either proximity or contact between the head transducer and the disk surface. One approach is to measure the amplitude of a pattern written on the magnetic storage medium as the head transducer is brought closer to the disk surface and correlate the increase in read signal amplitude with a decrease in separation. In addition to the spacing change, head-media contact can be detected using this approach, since the amplitude cannot increase once the head transducer is in contact with the disk surface. To calibrate measurement of contact between the head and the media and/or asperities, the head is touched to the disk to establish a zero clearance reference point. A head-media separation signal may be monitored, such as a signal produced by a reader or a thermal sensor provided at the head transducer, and a resulting change in temperature is measured. The thermal sensor can be a temperature coefficient of resistance (TCR) sensor such that measuring the change in temperature is effected by measuring the resistance change of the TCR sensor. An example thermal sensor may be a dual-ended temperature coefficient of resistance sensor (DETCR).

According to various techniques, to measure the resistance change, DC current is supplied to a thermal sensor and the voltage across the sensor is measured. Head-medium contact is detected using the measured sensor signal. Any resistance change above a pre-defined threshold can be used to identify contact. Some techniques use modulation of the heater of the transducer to provide an intermittent contact signal to detect contact. This AC mode contact detection technique allows the response at the driving frequency to be isolated from other noise frequencies for improved signal to noise ratios.

In some HAMR devices, a laser is used to heat the medium, reducing the coercivity of the magnetic material and allowing magnetic writing to high coercivity magnetic materials. The HAMR laser can also be used to generate a signal used to produce contact data and/or head-media spacing (HMS) data.

It may be advantageous to generate an AC response in the thermal sensor by providing modulated laser light. The resulting signal from the thermal sensor is then monitored for amplitude or phase changes as an indicator of contact. Laser light can be modulated at a wider range of frequencies than mechanical response frequencies, providing shorter sampling periods and faster response times. When modulating the laser light at frequencies that are higher than the mechanical response frequencies, the mechanical motion of the slider due to the laser may be negligible. The lack of mechanical movement allows a more accurate measurement because the measurement is not disturbed by mechanical motion. In addition, techniques that rely on modulated laser light can allow for higher temperature implementations. When the sensor is operating at higher temperature, the temperature change between the head and the media is larger, which can provide a larger response (greater signal to noise ratio) when contact with the media occurs. The difference in heat flow between contact and non-contact is greater with a higher temperature, and thus the contact detection signal is larger.

Embodiments of the disclosure are directed to apparatuses and methods for using modulated laser light to measure HMS and/or head-media contact. For example, some approaches discussed herein involve a laser source configured to produce laser light and to modulate the amplitude of the laser light. A transducer, e.g., disposed on a slider, has an air bearing surface and is configured to use the laser light as an energy source for heating a region of a magnetic medium. A thermal sensor is located at or near the air bearing surface and is subject to cyclic heating by the modulated laser light. The thermal sensor is configured to produce a modulated sensor signal in response to the cyclic heating.

In various embodiments, the laser source is external of the transducer. According to some implementations, the laser source is integral to the transducer. In HAMR, the laser produces laser light having a power to alter a coercivity of the magnetic medium by heating a region of the magnetic medium.

In some implementations, the modulated laser light has a power less than a power required to cause light-induced mechanical modulation of the transducer and/or an air bearing defined between the air bearing surface and the medium. According to various aspects, the modulated laser light has a frequency higher than mechanical response frequencies associated with mechanical motion of the laser source or the transducer. The power of the modulated laser light has a power lower than a power required to alter a coercivity of the magnetic medium. According to some implementations, the power of the modulated laser light has a power lower than a power required to write data to or erase data from the magnetic medium. In some cases, modulating the laser light comprises modulating the laser light at a plurality of excitation frequencies. Modulating the laser light may comprise amplitude modulating the laser light.

In some embodiments, the modulated sensor signal is suitable for sensing and/or measuring spacing changes between the transducer and the medium. The sensor signal can be used to produce head-media clearance data, head-media separation data, head-media proximity data, head-media contact data and/or head-thermal asperity contact data. In various embodiments, the modulated sensor signal may have a frequency between about 500 Hz and 2 MHz or between about 1 kHz and 500 kHz.

Various approaches include a NFT at or near the air bearing surface and the thermal sensor can be arranged so that it is in a range of between 4 micrometers to about 0.5 micrometers from the NFT. For example, the thermal sensor can be no more than about 4 micrometers, or no more than about 3 micrometers, or no more than about 2 micrometers, or no more than about 1.5 micrometers, or no more than about 1.2 micrometers, or no more than about 1 micrometer, or no more than about 0.8 micrometers, or no more than about 0.5 micrometers from the NFT In some implementations a detector is configured to detect contact between the transducer and the medium using the modulated sensor signal. In various approaches, the detector is configured to detect contact between the transducer and the medium using a change a waveform parameter of the sensor signal as a function of heater power. For example, in various implementations, the waveform parameter that indicates contact may be waveform shape, amplitude and/or phase of the sensor signal as a function of heater power.

Figure 1:
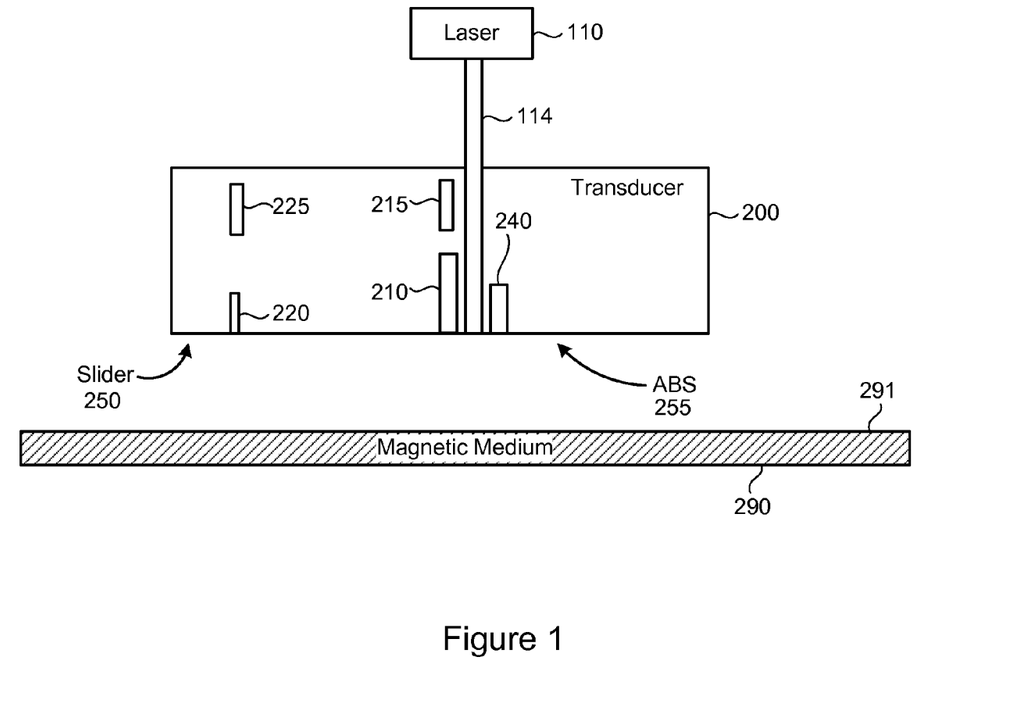
FIG. 1 is a block diagram that shows a cross-sectional view of a head transducer.

Referring now to FIG. 1, a block diagram shows a cross-sectional view of a head transducer 200. The representative components on the transducer 200 shown include a reader 220, a writer 210, a reader heater 225, and a writer heater 215. The transducer 200 may be used as a read/write head of a data storage device, such as a hard disk drive. The transducer 200 includes a slider 250 having a leading edge and a trailing edge. The writer 210 and reader 220 are typically located at the trailing edge of the slider 250 and maintained in a close spaced-apart relationship (e.g., 20 nm) when writing and reading data to and from a surface 291 of a magnetic storage medium 290, e.g., a disk. When the slider 250 is located over the surface 291 of magnetic storage medium 290, a flying height is maintained between the slider 250 and the surface 291 by a downward force. This downward force is counterbalanced by an air cushion (i.e., air bearing) that is created between the medium surface 291 and an air bearing surface (ABS) 255 of the slider 250 when the disk is rotating.

The transducer 200 shown in FIG. 1 also includes a laser arrangement. The laser arrangement includes a waveguide 114 configured to optically couple a laser 110 (e.g., a laser diode) to an NFT 240 located at the air bearing surface 255 of the slider 250. According to the embodiment illustrated in FIG. 1, the laser 110 is situated externally of the head transducer 200, such as on a head suspension assembly (HSA). In some embodiments, the laser 110 is integral to the transducer 200. The laser 110 is electrically coupled to a power supply that is configured to turn the laser 110 off and on, and to modulate laser light produced by the laser 110 at a desired frequency. In various embodiments, the power supply is controlled by a processor, a controller or a control circuit, and has an output power that can be adjusted as desired. For example, the power supply to the laser 110 can be configured to provide control of some or all of the following parameters: output power (amplitude) of the laser light; frequency of the laser light; and duty cycle.

As was previously discussed, laser light produced by the laser 110 is coupled to the NFT 240 via the waveguide 114. The NFT 240, in response to the incident laser light, generates a high power density in a near-field region that is directed to the magnetic storage medium 290. This high power density in a near-field region of the NFT 240 causes an increase in local temperature of the medium 290, thereby reducing the coercivity of the magnetic material for writing or erasing information to/at the local region of the medium 290. A portion of the laser light energy communicated to the NFT 240 is absorbed and converted to heat within the slider 250. This heating results in thermal expansion, protrusion at the air bearing surface 255, and a change in both head-media clearance and head-media separation. Head-media separation is the distance between the closest point of the transducer and a nominal plane of the media. Head-media clearance is the distance between the closest point of the transducer to the highest point of the media in the vicinity of the transducer. In addition to the NFT 240, the transducer 200 typically includes additional heat sources that can cause further expansion and protrusion of the air bearing surface 255. Such additional heat sources, when active, include one or more of the writer 210 (writer coil), writer heater 215, and reader heater 225.

Figure 2:
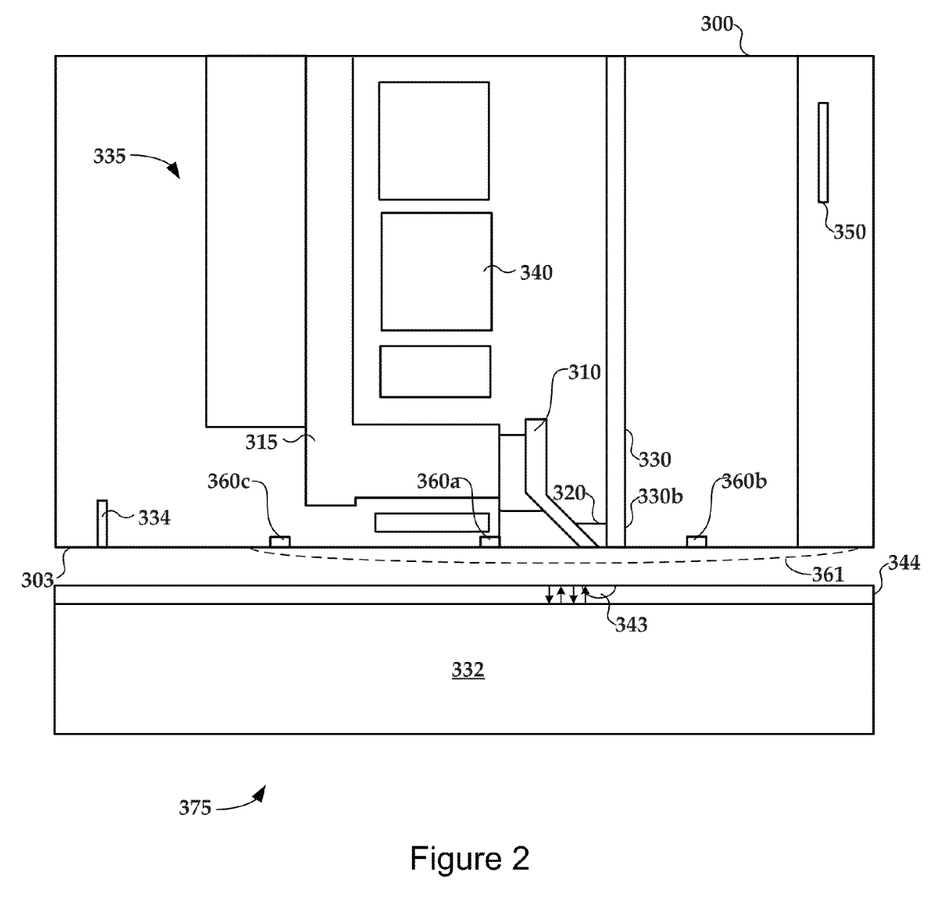
FIG. 2 depicts detailed structures and features that may be included in a HAMR transducer in accordance with various embodiments.

A representative embodiment of a portion of a head transducer (also known as a slider) that incorporates a thermal sensor at a protrusion region of the transducer is shown in FIG. 2. FIG. 2 shows a cross-section of a head transducer 300 in accordance with various embodiments. An NFT 320 is located between a write pole 310 and a waveguide 330. The portion of head transducer 300 illustrated in FIG. 3 includes three heat sources; a write coil 340, NFT 320, and a heater 350, that cause a thermal protrusion, indicted by dashed line 361.

One or more thermal sensors, e.g., TCR sensors, can be located within a protrusion region at one or more optional locations, as shown in FIG. 2. FIG. 2 shows optional thermal sensors 360a, 360b, 360c located at different locations within the region of protrusion 361. In many embodiments only one thermal sensor is used. In some embodiments, as illustrated by thermal sensor 360a, a thermal sensor is located in the region of the writer 335, near the write pole 310, return pole 315, and the NFT 320. In one configuration, at least a portion of thermal sensor 360a is co-extensive with a portion of the return pole 315 along an axis normal to the air bearing surface. Thermal sensor 360a is situated in an uptrack/downtrack direction from at least one of the NFT 320 and write pole 310. In some configurations, a thermal sensor is located outside the region of the writer 335. For example, thermal sensor 360b is located at a second optional location within the protrusion region of the air bearing surface and adjacent the write pole 310 (but outside of the writer components) on a side of the writer 335 opposite the reader 334. Thermal sensor 360b is located between a waveguide 330, which is optically coupled to NFT 320, and heater 350 (e.g., positioned nearer to waveguide 330 than heater 350). Thermal sensor 360c illustrates a third optional location within the protrusion region of the air bearing surface and adjacent the return write pole 315 (but outside of the writer components) between the writer 345 and the reader 334.

It is understood that thermal sensor can be located elsewhere relative to write pole 310 and NFT 320 yet still be located within a protrusion region of these components. For example, thermal sensor can be located between write pole 310 and a coil 340 that energizes the write pole 310.

According to some embodiments, a protrusion region can be a region of the air bearing surface 303 between the write pole 310 and a write return pole 315; between a write return pole 315 and NFT 320, and/or between write return pole 315 and a waveguide 330. In other embodiments, a protrusion region can be considered a region of ABS 303 originating at a heat source, such as NFT 320, write pole 310, and/or heater and extending generally outwardly from about 1-3 micrometers around the heat generating element(s). In FIG. 2, the ABS protrusion is indicated by dashed line 361, and the location of maximum ABS protrusion can occur at or between NFT 320 and write pole 310, for example. The protrusion region can be considered a region of ABS 303 extending outwardly from an location of maximum protrusion to locations that expand by at least a predetermined percentage of maximum ABS protrusion e.g., 70%, 80%, 90% or 95%. In some embodiments, the protrusion region is defined by a region of ABS 303 that protrudes at least 80% relative to a region of maximum protrusion of ABS 303. In other embodiments, the protrusion region is defined by a region of ABS 303 that protrudes at least 90% relative to a region of maximum protrusion of ABS 303.

The head transducer 300 may comprise a relatively thick substrate on which is disposed the multiplicity of thin layers. The layers cooperate to define the respective components of the head transducer 300. The layers include a multiplicity of layers tailored to form, for example, a magnetic writer 335 and a magnetic reader 334. The layers may also be patterned to form coils 340 which, when energized with an electrical current, produce a magnetic field passes through the writer 335 and through a portion of the writeable medium 375. One end or terminus 310 (referred to as a write pole) of the writer 335 may be configured to produce a high flux density of the magnetic field. Another end or terminus 315 (referred to as a return pole) of the writer 335, coupled to the write pole 310 via a yoke of the writer, may be configured to produce a lower flux density.

The layers of the head transducer 300 also layers tailored to form a (passive) waveguide 330, an NFT 320, and the thermal sensor shown in FIG. 2 at optional locations as sensor 360a, 360b, 360c. A laser (not shown in FIG. 2) may be formed in the head transducer layers, may be mounted on the heat transducer or may be disposed in a cavity in the head transducer and is optically coupled to the NFT 320 through the waveguide 330.

The writeable medium 375 may be configured in any known way, but typically it includes a plate or substrate 332 on which at least a hard magnetic layer 344 is deposited or otherwise formed. A small portion or spot 343 of the layer 344 may be heated sufficiently to reduce the coercivity of the material enough so that the magnetic field from the magnetic write pole 310 is strong enough to change the magnetization direction of the recording layer 344. Bits of information may then be recorded in the form of a perpendicular upward downward magnetization direction for a series of magnetic domains in the layer 344.

The heating of the spot 343 in connection with the write procedure may be provided directly by the NFT 320 and indirectly by the laser. When the laser is energized, laser light is emitted from the laser is coupled into the waveguide, whether by end-fire coupling or otherwise. The laser light is conveyed to a distal end 330b of the waveguide 330. In some cases, the distal end may correspond to a focal point or focal region of a solid immersion mirror (SIM) or a solid immersion lens (SIL). Located at or near the distal end 330b is the NFT 320, which may be formed as part of the plurality of layers. The NFT 330 utilizes plasmons to convert the power density of the incident laser light into a high power density in a near-field region that is typically smaller than the diffraction limit for the laser light. The high power density provided by the NFT 320 in the near-field region is absorbed by the nearby writeable medium 375 to produce localized heating of the spot 343. By positioning an emitting end of the NFT 320 close enough to the write pole 310 of the writer 335, at least a portion of the heated spot 343 can be exposed to the high magnetic flux emitted by the write pole 310 before passing out of range (due to the relative motion of the writeable medium 375) so that the magnetic field at the write pole 310 is capable of changing the magnetization direction of the spot 343.

The heating of spot 343 also causes protrusion (indicated by dashed line 361) of a region of the air bearing surface 303 of the head 300. To measure the temperature change and corresponding protrusion, one or more thermal sensors, e.g., one or more of thermal sensors 360a, 360b, 360c can be located proximate the NFT 329 and/or write 310 or return 315 poles in a protrusion region. FIG. 2 shows optional locations for a thermal sensor. Thermal sensor 360a is located at a first optional location within the protrusion region of the air bearing surface and within the writer 335, e.g., between the write return pole 315 and write pole 310; thermal sensor 360b is located at a second optional location within the protrusion region of the air bearing surface and adjacent the write pole 310 (but outside of the writer components); and thermal sensor 360c is located at a third optional location within the protrusion region of the air bearing surface and adjacent the return write pole 315 (but outside of the writer components.

The NFT 320 may be a suitably sized pin or other structure and may be made of a metal such as gold or other suitable materials. The NFT 320 may have any suitable design known in the art. The NFT 320 is shown in FIG. 2 to be close to but separated from waveguide 330, but in other embodiments the NFT may be disposed within the waveguide 330. In still other embodiments, the laser may be integrated into the head transducer and the waveguide may be omitted. In an integrated laser configuration, the NFT may couple directly to the integrated semiconductor laser.

Figure 3:
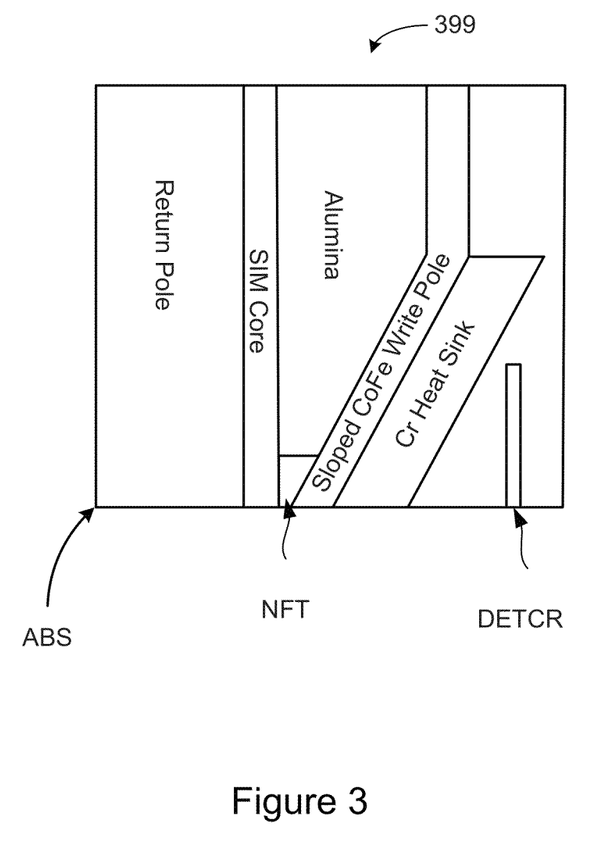
FIG. 3 illustrates a transducer in accordance with a particular embodiment.

FIG. 3 illustrates a transducer 399 in accordance with a particular embodiment. The transducer 500 includes a HAMR writer comprising an NFT optically coupled to a waveguide core and solid immersion mirror (SIM). The NFT is configured to convert laser light to surface plasmons heat the media surface. The writer also includes a coupled sloped CoFe write pole and return pole which are separated by an alumina layer that serves as an electrical insulator and the SIM waveguide core. The transducer 399 includes a thermal sensor comprising a DETCR that is arranged a distance from the NFT. The DETCR is separated from write pole and NFT by a Cr heat sink. FIG. 2 shows the proximity of the DETCR to the SIM core, NFT, and write pole. The closer the DETCR is to the SIM core and NFT, the more sensitive the contact detect technique will be.

Figure 4:
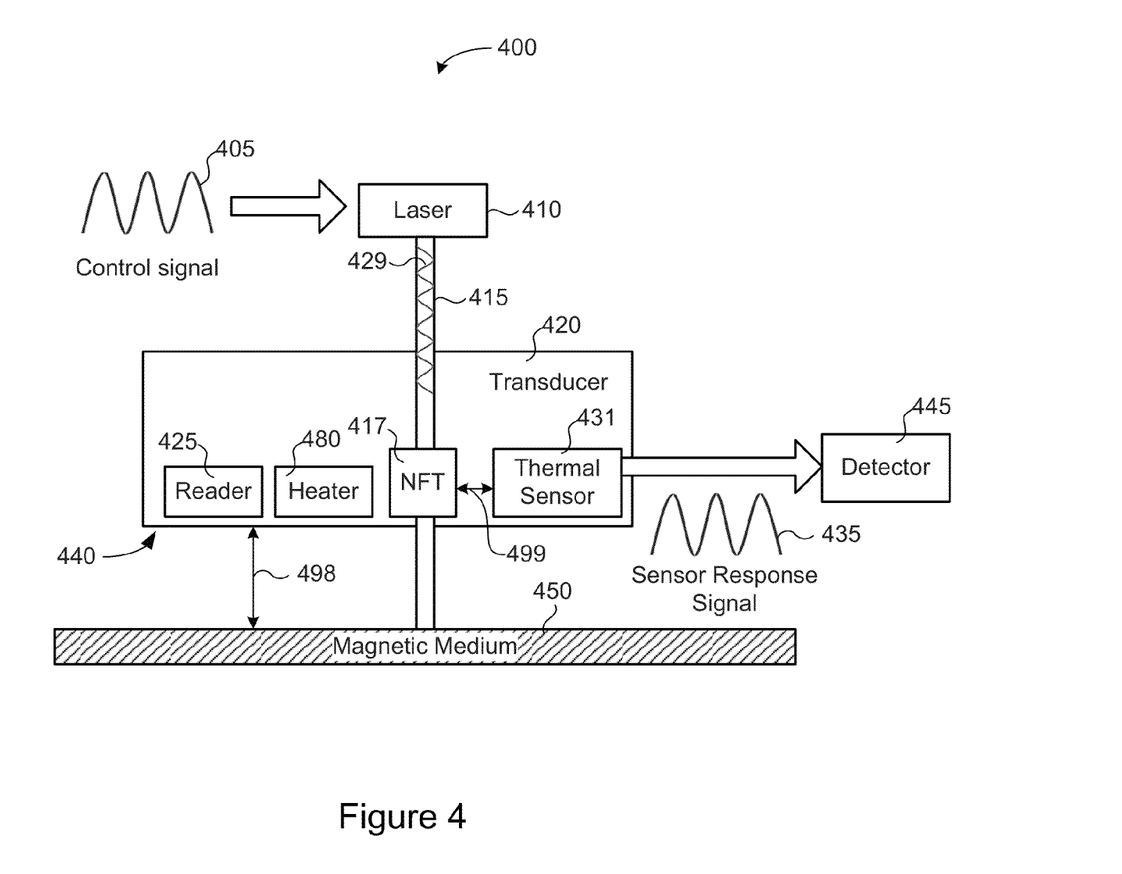
FIG. 4 is a block diagram illustrates a cross-sectional view of an apparatus that can be used to measure HMS and/or contact according to some embodiments.

Turning now to FIG. 4, a block diagram shows a cross-sectional view of an apparatus 400 that can be used to measure HMS and/or contact according to some embodiments. The apparatus 400 includes a transducer 420 that has an air bearing surface 440. The transducer uses light 429 from a laser 410 that is controlled by control signal 405 to produce AC modulated laser light, wherein the amplitude of the laser light is modulated at a specified frequency or at a plurality of frequencies. The laser may be external to the transducer or may be integral to the transducer.

In HAMR, the laser produces laser light having a power to alter a coercivity of the magnetic medium by heating a region of the magnetic medium 450. HMS and/or contact detection can be accomplished using AC modulated laser light at a lower power than is required for HAMR. The AC modulated laser light 429 cyclically heats a thermal sensor 431, e.g. a TCR sensor or DETCR sensor. The thermal sensor 431 is configured to produce a modulated sensor signal 435 in response to the cyclic heating.

The apparatus 400 includes a near-field transducer 417 disposed at or near the air bearing surface 440 that is optically coupled to the laser 410 through the waveguide 415. The NFT is arranged at a distance 499 from the thermal sensor. According to various implementations, the thermal sensor 431 can be arranged so that it is in a range of between about 2 micrometers to about 0.5 micrometers from the NFT. The thermal sensor 431 can be no more than about 4 micrometers, or no more than about 3 micrometers, or no more than about 2 micrometers, or no more than about 1.5 micrometers, or no more than about 1.2 micrometers, or no more than about 1 micrometer, or no more than about 0.8 micrometers, or no more than about 0.5 micrometers from the NFT 417.

The modulated laser light 429 heats the thermal sensor 431 and, in response, the thermal sensor 431 generates an AC response 435. In a particular embodiment, the modulated laser light 429 has a power less than the power required to cause light-induced mechanical modulation of the transducer 420 and/or less than the power required to cause light-induced mechanical modulation of an air bearing defined between the air bearing surface 440 and the medium 450. For example, the modulated laser light 429 may have a frequency higher than mechanical response frequencies associated with mechanical motion of the laser 410 or the transducer 420. According to some aspects, the power of the modulated laser light 429 can have a power lower than a power required to alter a coercivity of the magnetic medium 450. For example, the power of the laser light 429 may be less than the power required write data to or erase data from the magnetic medium 450.

The modulated sensor signal 435 generated in response to the laser light is suitable for sensing and/or measuring spacing changes between the transducer 420 the medium 450. The modulated sensor signal 435 is suitable for detecting contact between the transducer 420 and the medium 450 and/or detecting contact between the transducer and asperities of the medium. In various embodiments, the modulated sensor signal may have a frequency between about 500 Hz to 10 MHz, between about 1 kHz to 1 MHz, between about 100 kHz to 1 MHz, or between about 100 kHz to 600 kHz.

The sensor signal 435 can be used to produce head-media clearance data, head-media separation data, head-media proximity data, head-media contact data and/or head-thermal asperity contact data, for example. Head-media separation data is data related to the distance between the closest point of the transducer and a nominal plane of the media; head-media clearance data is data related to the distance between the closest point of the transducer to the highest point of the media in the vicinity of the transducer; head-media proximity is head-media clearance along with the ability to convert the clearance to a measurable value; head-media contact occurs when head-media separation is zero; and head-media thermal asperity contact occurs when the distance between the closest point of the transducer and the closest point of a protruding media defect is zero.

The transducer 420 includes a heater 480 that can cause expansion and protrusion of the air bearing surface 440 towards the magnetic medium 450. Driven with sufficient power, the heater 480 can cause the ABS 440 to protrude until the ABS 440 makes contact with the surface of the magnetic medium 450. When the ABS 440 comes into contact with the magnetic medium 450, the thermal mass of the magnetic medium 450 cools the ABS 440 and the thermal sensor 431. The cooling of the ABS 440 and the thermal sensor 431 causes an abrupt change in the amplitude and/or phase of the sensor signal 435. After the initial cooling, the frictional resistance due to the contact between the ABS 440 and the magnetic medium 450 heats the ABS 440 and the thermal sensor 431, which causes the amplitude and/or phase of the sensor signal 435 to change.

The apparatus 400 can include a detector 445 configured to receive the sensor signal 435. The detector is configured to monitor the sensor signal at the modulation frequency of the laser light. The detector 445 is configured to detect contact between the transducer 420 and the medium 450 using the modulated sensor signal 435. According to some implementations, the detector 445 is configured to detect contact between the transducer 420 and the medium 450 using a change in amplitude of the sensor signal 435 as a function of heater power. In some implementations, the detector 445 is configured to detect contact between the transducer 420 and the medium 450 using a change in phase of the sensor signal 435. Amplitude and phase are examples of waveform features of the sensor signal that can be used to detect head-media contact. As previously discussed, other waveform features of the sensor signal can alternatively or additionally be used. For example, the shape of the waveform may be compared to a known shape to detect one or more of head-media contact, head-media proximity, head-media clearance, and/or head-asperity contact.

The apparatus may include a reader 425 at or near the ABS 440 of the transducer 420. The reader 425 is configured to sense magnetic bits stored in the medium 450. The reader 425 generates a signal in response to sensing the magnetic bits. The amplitude of the reader signal is function of the distance 498 between the ABS 440 and the medium 450. The reader 425 can be configured to generate a reader signal indicative of spacing changes between the transducer 420 and the medium 450.

Using the modulated sensor signal that is produced at a constant laser power, the rate of change in resistance ($\Delta R$) of a thermal sensor located at the head transducer can be measured. An example thermal sensor may be a TCR sensor, such as a dual-ended temperature coefficient of resistance sensor (DETCR). The rate of change in heater power ($\Delta P$) can also be measured. The change in resistance and the change in heater power can be used to produce a detection metric. For example, using the ratio of the rate of change in resistance ($\Delta R$) to the rate of change in heater power ($\Delta P$), head-medium contact can be detected.

The ratio of a rate of change in resistance ($\Delta R$) to a rate of change in power ($\Delta P$), denoted $\Delta R/\Delta P$, provides a metric for evaluating head-media spacing and performing head-media contact detection. The metric $\Delta R/\Delta P$ decreases linearly with decreasing head-to media clearance. Detecting a deviation from linearity in $\Delta R/\Delta P$ and a minima indicates head-media contact and head-media caused cooling and frictional heating.

Figure 5:
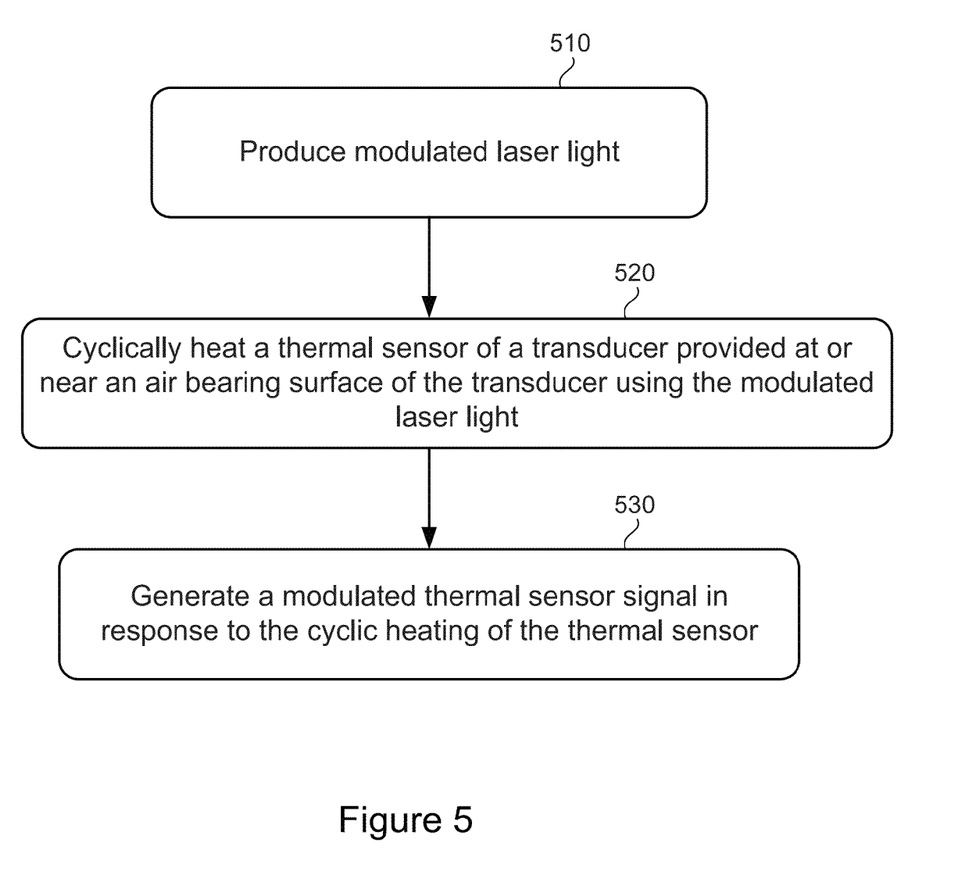
FIGS. 5-7 illustrate various processes in accordance with embodiments described herein.
Figure 6:
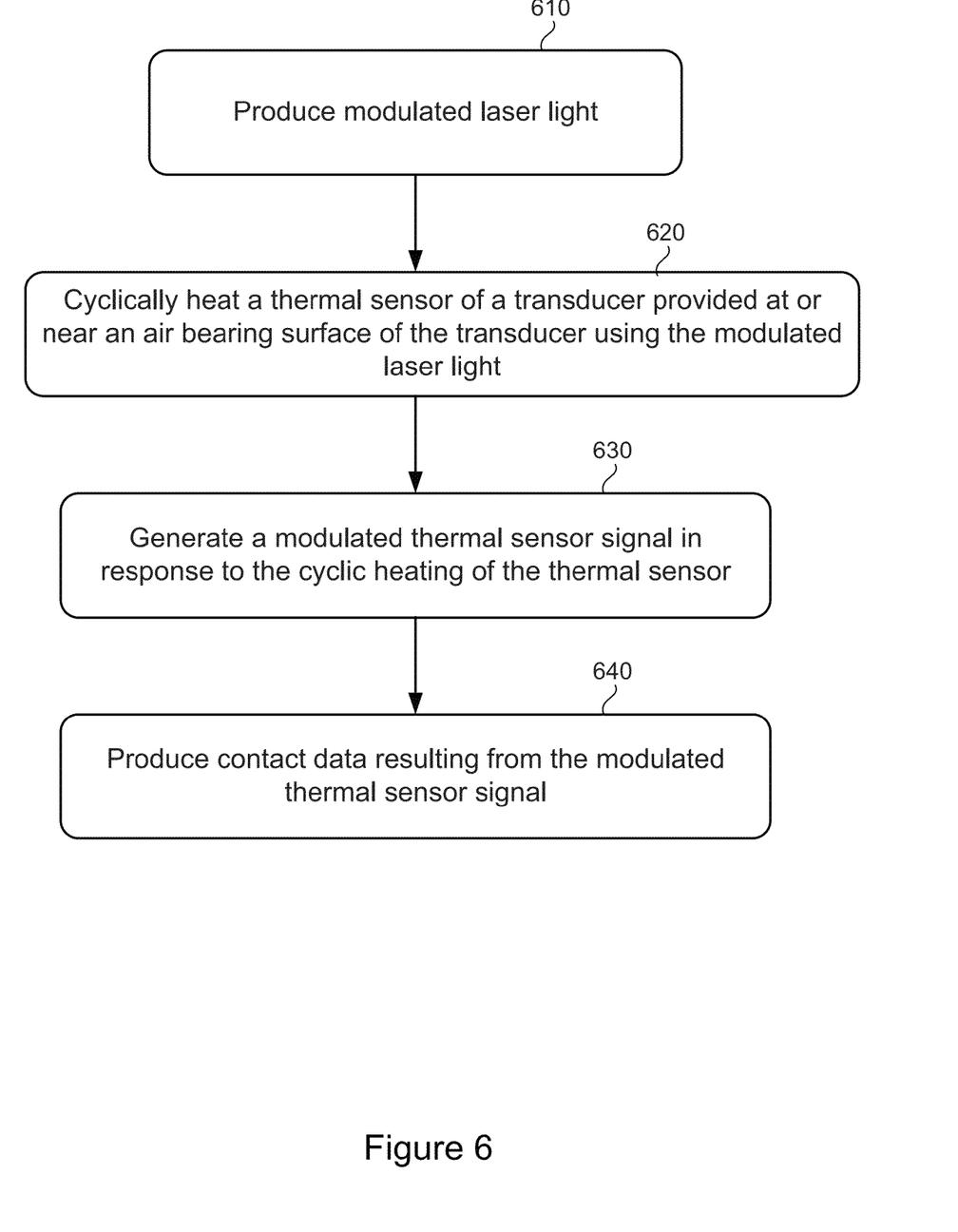
Figure 7:
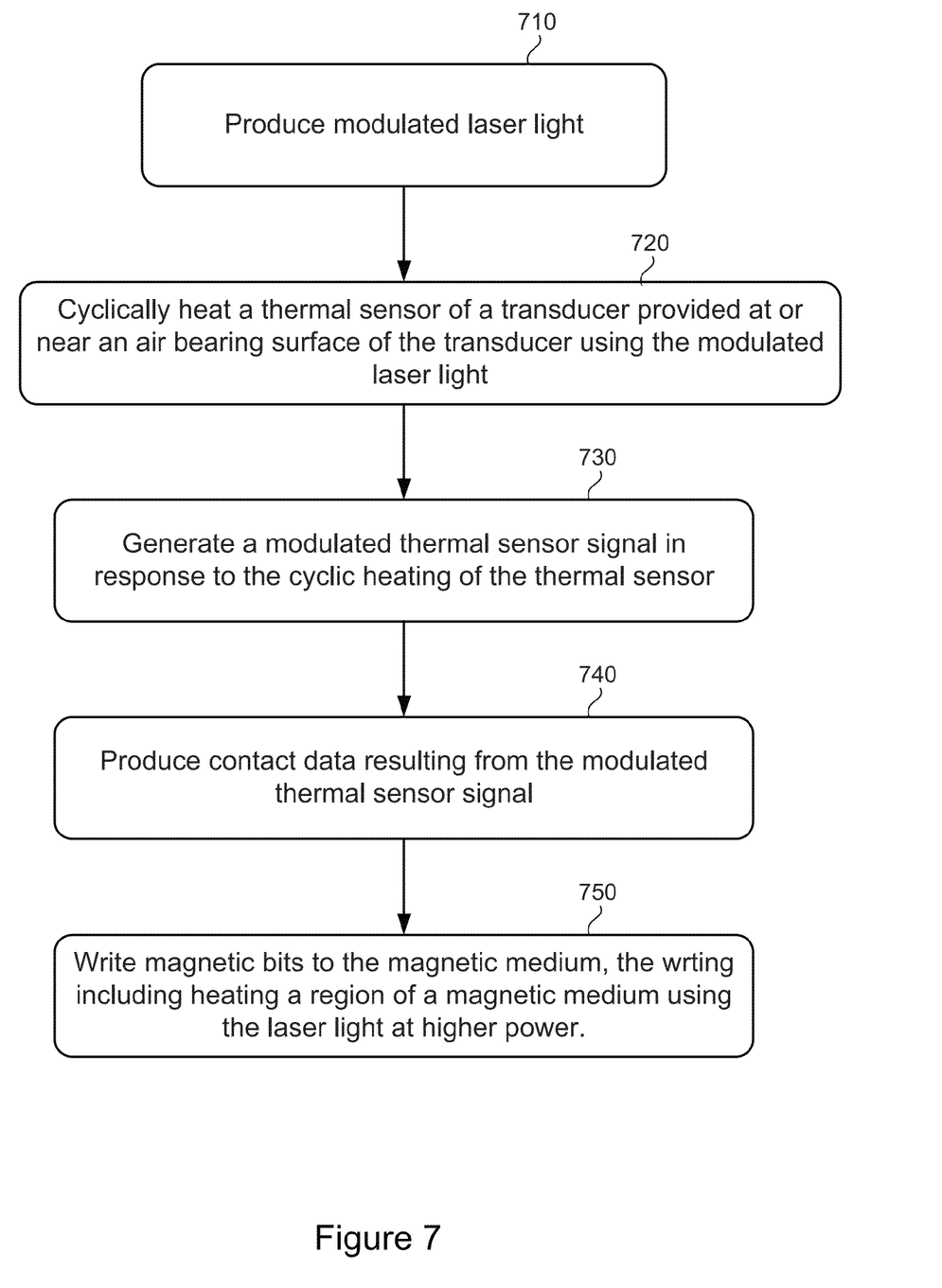

FIGS. 5-7 illustrate various processes in accordance with various embodiments. The processes illustrated in FIGS. 5-7 can be implemented, for example, using the apparatuses shown in FIGS. 1-4. According to FIG. 5, modulated laser light is produced 510. A thermal sensor of a transducer is provided at or near an air bearing surface between the transducer and a magnetic medium. The thermal sensor is cyclically heated 520 using the modulated laser light. The thermal sensor signal generates 530 a modulated signal in response to the cyclic heating of the thermal sensor. The modulated signal can used to detect contact and/or spacing between the ABS and the magnetic medium and/or between the ABS and asperities of the magnetic medium. According to various implementations, the power of the modulated laser light is less than a power required to cause light-induced mechanical modulation of the transducer and/or an air bearing defined between the air bearing surface and the medium. The power of the laser light used to generate the modulated sensor signal is less than a power of the laser light required to alter the coercivity of the medium.

According to the embodiment illustrated in FIG. 6, modulated laser light is produced 610. A thermal sensor of a transducer is provided at or near an air bearing surface between the transducer and a magnetic medium. The thermal sensor is cyclically heated 620 using the modulated laser light. The thermal sensor signal generates 630 a modulated signal in response to the cyclic heating of the thermal sensor. The modulated signal can used to detect contact and/or spacing between the ABS and the magnetic medium and/or between the ABS and asperities of the magnetic medium. Contact data resulting from the modulated thermal sensor signal is produced 640. The contact data may include one or more of clearance data, head-media separation data, proximity sensing data, head-media contact data, and head-thermal asperity contact data, for example.

According to the embodiment illustrated in FIG. 7, modulated laser light is produced 710. A thermal sensor of a transducer is provided at or near an air bearing surface between the transducer and a magnetic medium. The thermal sensor is cyclically heated 720 using the modulated laser light. The thermal sensor signal generates 730 a modulated signal in response to the cyclic heating of the thermal sensor. The modulated signal can used to detect contact and/or spacing between the ABS and the magnetic medium and/or between the ABS and asperities of the magnetic medium. Contact data resulting from the modulated thermal sensor signal is produced 740. After the contact data has been collected, magnetic bits are written 750 to the magnetic medium. Writing the magnetic bits includes heating a region of the magnetic medium using the laser light at higher power than the power used to generate the modulated sensor signal. The laser light at the higher power is sufficient to alter the coercivity of the magnetic medium.

EXAMPLES

The following example summarizes an investigation of a DETCR having an output signal that is modulated in response to laser light modulation in accordance with various embodiments. This example is provided for purposes of illustration, and not of limitation.

Figure 8:
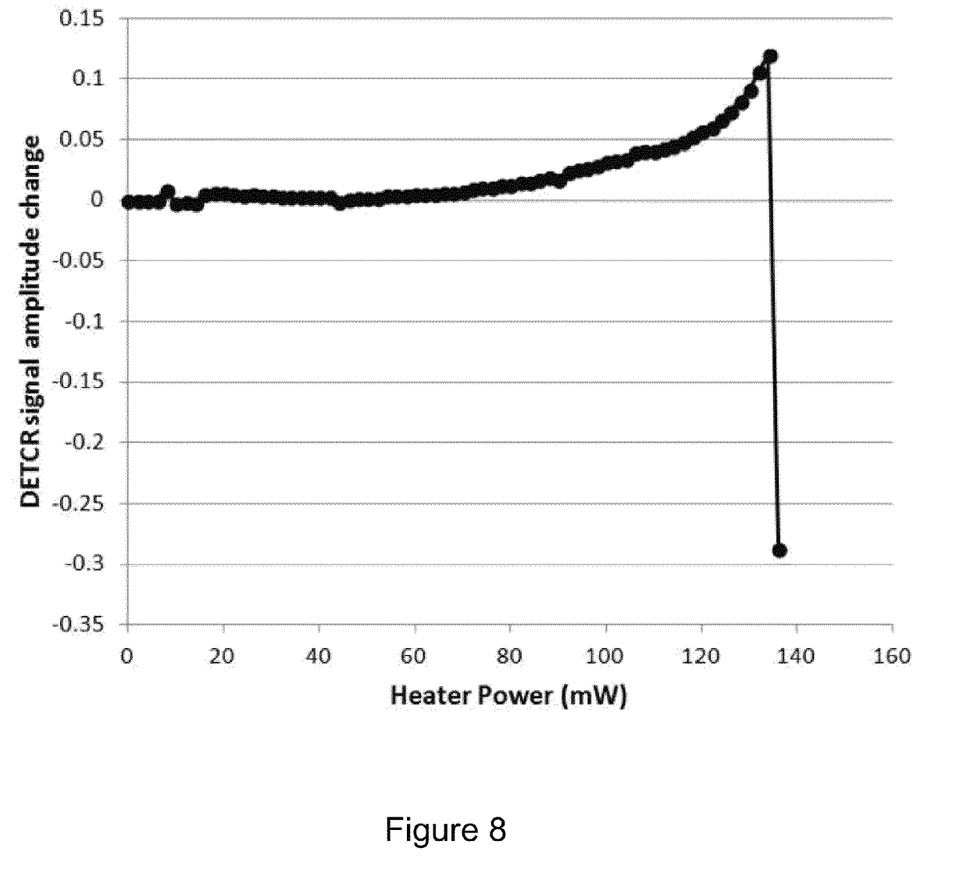
FIG. 8 shows experimental spinstand data demonstrating the change in the DETCR amplitude response due to laser heating as a function of heater power.
Figure 9:
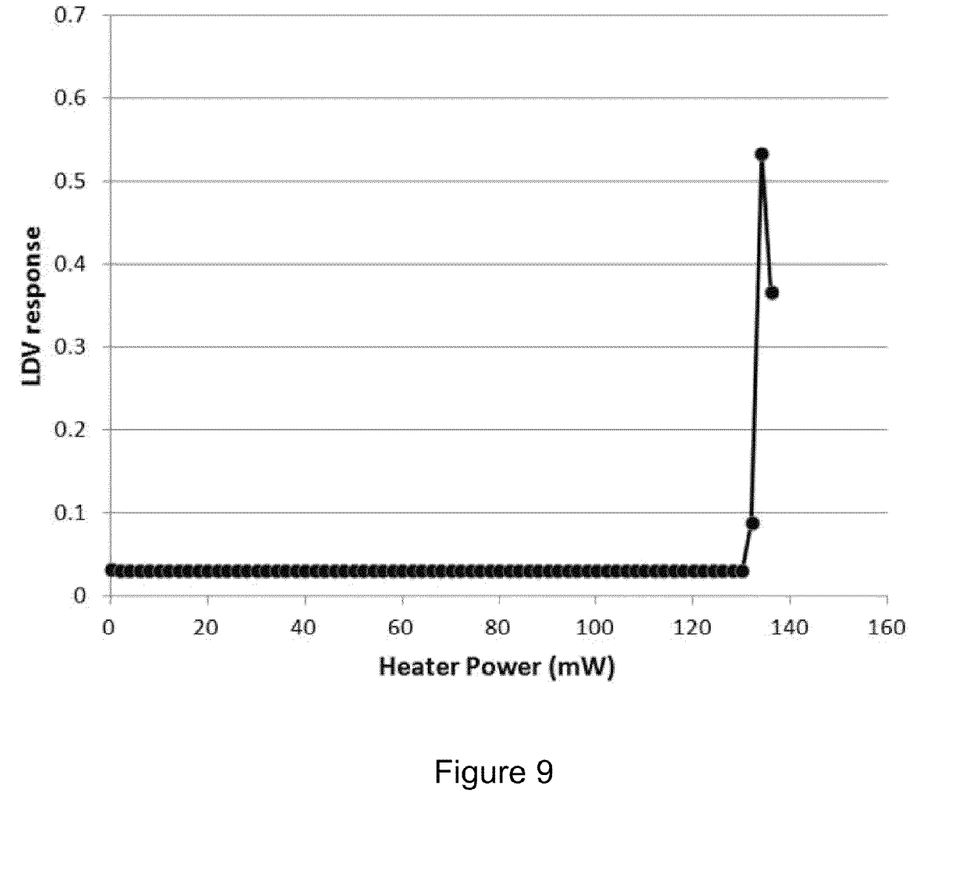
FIG. 9 shows the corresponding laser doppler velocimetry (LDV) data identifying the contact power.

FIG. 8 shows experimental spinstand data demonstrating the change in the DETCR amplitude response due to laser heating as a function of heater power. FIG. 9 shows the corresponding laser doppler velocimetry (LDV) data identifying the contact power.

Sample data from a free-space HAMR head making contact with a smooth media surface is shown in FIGS. 8 and 9. The DETCR response to the laser (in voltage) is plotted as a function of heater power. Several curves are shown, each for a different laser frequency. Each curve has been shifted by subtracting the DETCR response at zero heater power. Each curve shows that the DETCR response increases gradually as the heater power is increased, and then when contact is made, the DETCR response undergoes a rapid decrease. The magnitude of this decrease at lower frequencies (100 and 300 kHz) is sufficiently large for detecting contact.

Figure 10:
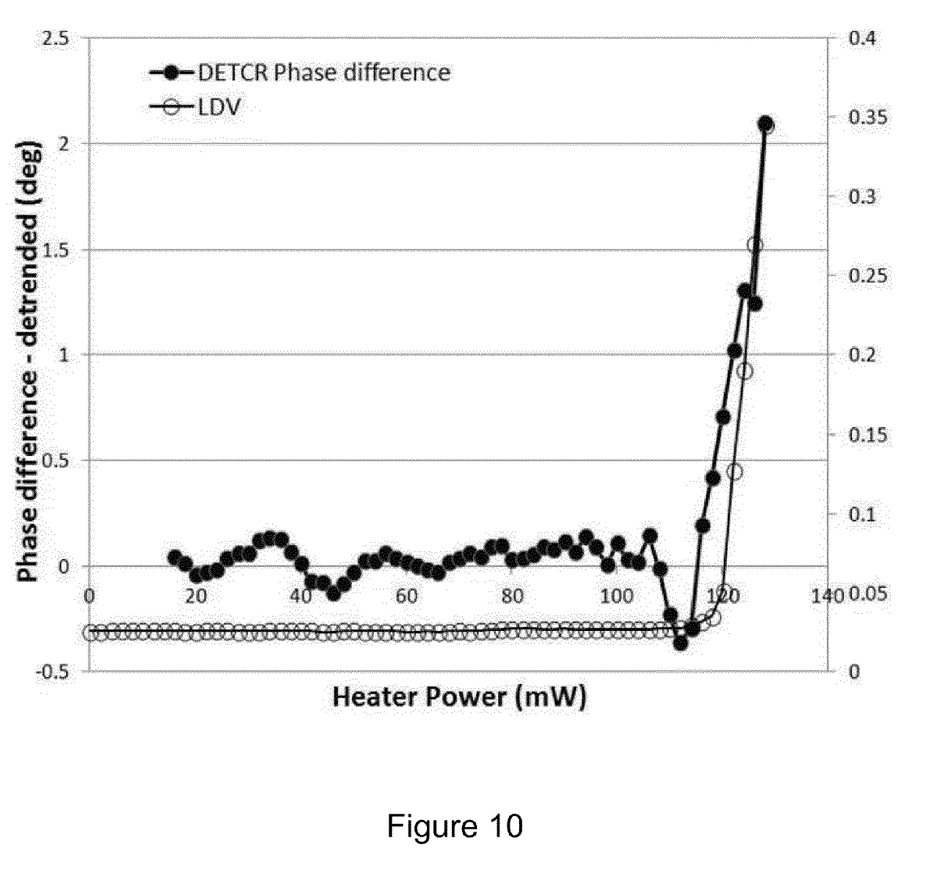
FIG. 10 shows deviation in the DETCR phase from an 8-point trailing trend as a function of heater power.

A second metric for detecting contact is the phase or phase change of the DETCR response when it makes contact. The phase difference between DETCR and incoming light is sensitive to the thermal environment, which changes abruptly when contact is made. Example data illustrating the ability is shown in FIG. 10. FIG. 10 shows deviation in the DETCR phase from an 8-point trailing trend as a function of heater power. In this example, the components were tested on HAMR media. The phase shows a significant change when contact is made (as measured by an LDV). By taking the trailing average of 8 data points, some point-to-point noise is minimized and the deviation from the expected trend can be more clearly identified.

The underlying physics for why this technique is sensitive is that the laser applies heat to the DETCR and the resulting temperature rise is dependent upon the cooling pathways around the DETCR. When the DETCR is not in contact but in close proximity to the media it is at it hottest operating point, and when it makes contact with the media, it is cooled by direct-contact conduction.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
    a laser source configured to produce laser light and to modulate the laser light;
    a transducer comprising an air bearing surface and configured to use the laser light as an energy source for heating a region of a magnetic medium;
    a thermal sensor at or near the air bearing surface and subject to cyclic heating by the modulated laser light, the thermal sensor configured to produce a modulated sensor signal in response to the cyclic heating; and
    a detector coupled to the thermal sensor, the detector configured to detect one or both of spacing changes and contact between the transducer and the magnetic medium using the sensor signal.

2. The apparatus of claim 1, wherein the modulated laser light has a power less than a power required to cause light-induced mechanical modulation of the transducer.

3. The apparatus of claim 1, wherein the modulated laser light has a power less than a power required to cause light-induced mechanical modulation of an air bearing defined between the air bearing surface and the medium.

4. The apparatus of claim 1, wherein the power of the modulated laser light has a power lower than a power required to alter a coercivity of the magnetic medium.

5. The apparatus of claim 1, wherein the detector is configured to detect contact and spacing changes between the transducer and the medium.

6. The apparatus of claim 1, wherein the detector is configured to detect contact between the transducer and asperities of the medium.

7. The apparatus of claim 1, wherein the modulated sensor signal has a frequency between 500 Hz and 10 MHz.

8. The apparatus of claim 1, wherein the modulated sensor signal has a frequency between 1 kHz and 1 MHz.

9. The apparatus of claim 1, further comprising:
    a near-field transducer at or near the air bearing surface and optically coupled to the laser source;
    wherein the thermal sensor is situated no more than about 4 micrometers from the near-field transducer.

10. The apparatus of claim 1, wherein the detector is configured to detect contact between the transducer and the medium using an amplitude change or a phase change in the sensor signal.

11. The apparatus of claim 1, wherein the detector is configured to detect contact between the transducer and the medium using a change of one or more waveform features of the sensor signal as a function of heater power.

12. The apparatus of claim 11, wherein the one or more waveform features comprise one or both of amplitude and phase.

13. The apparatus of claim 1, wherein the laser source is external of the transducer.

14. The apparatus of claim 1, wherein the laser source is configured to produce laser light having a power to alter a coercivity of the magnetic medium.

15. An apparatus, comprising:
    a laser source configured to produce modulated laser light at a power lower than that used when writing data to a magnetic medium;
    a transducer comprising an air bearing surface;
    a thermal sensor at or near the air bearing surface and configured to produce an AC signal in response to the modulated laser light; and
    a detector coupled to the thermal sensor, the detector configured to monitor the AC signal for a change in the AC signal as an indicator of a spacing change or contact between the transducer and the medium.

16. The apparatus of claim 15, wherein the detector configured to monitor the AC signal for one or both of an amplitude change and a phase change in the AC signal.

17. The apparatus of claim 15, wherein the detector is configured to detect contact between the transducer and the medium using one or both of an amplitude change and a phase change as a function of heater power.

18. The apparatus of claim 15, wherein the modulated laser light has a power less than a power required to cause light-induced mechanical modulation of the transducer.

19. The apparatus of claim 15, wherein the modulated laser light has a power less than a power required to cause light-induced mechanical modulation of an air bearing defined between the air bearing surface and the medium.

20. The apparatus of claim 15, wherein the modulated laser light has a power less than a power required to cause light-induced mechanical modulation of the transducer or of an air bearing defined between the air bearing surface and the medium.

21. A method, comprising:
    producing modulated laser light;
    cyclically heating a thermal sensor of a transducer provided at or near an air bearing surface of the transducer using the modulated laser light;
    generating a modulated thermal sensor signal in response to the cyclic heating of the thermal sensor; and
    detecting one or both of spacing changes and contact between the transducer and a magnetic medium using the sensor signal.

22. The method of claim 21, further comprising heating a region of a magnetic medium using the laser light.

23. The method of claim 21, wherein modulating the laser light comprises amplitude modulating the laser light.

24. The method of claim 21, further comprising producing at least one of head-media clearance data, head-media separation data, proximity sensing data, head-media contact data, head-thermal asperity contact data using the modulated thermal sensor signal.

* * * * *